(12) United States Patent
Lin et al.

(10) Patent No.: US 10,914,855 B2
(45) Date of Patent: Feb. 9, 2021

(54) GEOMORPHOLOGICAL STRUCTURE MONITORING SYSTEM

(71) Applicant: National Applied Research Laboratories, Taipei (TW)

(72) Inventors: Yung-Bin Lin, Taipei (TW); Tai-Shan Liao, Taipei (TW); Kuo-Chun Chang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 194 days.

(21) Appl. No.: 16/105,200

(22) Filed: Aug. 20, 2018

(65) Prior Publication Data

US 2019/0072689 A1   Mar. 7, 2019

(30) Foreign Application Priority Data

Sep. 5, 2017 (TW) .............................. 106130258 A

(51) Int. Cl.
*G01V 3/10* (2006.01)
*E02B 3/00* (2006.01)
*G01C 13/00* (2006.01)

(52) U.S. Cl.
CPC ................. *G01V 3/10* (2013.01); *E02B 3/00* (2013.01); *G01C 13/008* (2013.01)

(58) Field of Classification Search
CPC ............ G01V 3/10; E02B 3/00; G01C 13/008
See application file for complete search history.

(56) References Cited

U.S. PATENT DOCUMENTS

2007/0289380 A1\* 12/2007 Lin ...................... G01L 19/0046
  73/493
2016/0154128 A1\* 6/2016 Lin .......................... G01H 1/00
  367/131

FOREIGN PATENT DOCUMENTS

| JP | S55164309 A | 12/1980 |
| JP | H11351867 A | 12/1999 |
| TW | 589586 B | 6/2004 |
| TW | 201621280 A | 6/2016 |
| TW | I577966 B | 4/2017 |

OTHER PUBLICATIONS

European Patent Office, Search Report, dated Feb. 4, 2019, 9 pages.
Taiwanese Office Action of Corresponding Taiwan Application No. 10720307790, dated Apr. 12, 2018, 10 pages.

\* cited by examiner

*Primary Examiner* — Nathaniel T Woodward
(74) *Attorney, Agent, or Firm* — Muncy, Geissler, Olds & Lowe, P.C.

(57) ABSTRACT

A geomorphological structure monitoring system is disclosed, which comprises a supporting base having an accommodating space and a plurality of through holes, and at least a portion of the supporting base is embedded under a ground; a plurality of sensing devices arranged in the accommodating space vertically and embedded under the ground, the sensing devices may generate a sensing signal when the sensing devices are exposed from the ground due to the structural change of the ground; a signal processing device receiving and processing the sensing signal; and a transmission device connecting the sensing devices in series and the signal processing device.

6 Claims, 5 Drawing Sheets

GEOMORPHOLOGICAL STRUCTURE MONITORING SYSTEM

CROSS REFERENCE TO RELATED APPLICATION

This application claims the benefits of the Taiwan Patent Application Serial Number 106130258, filed on Sep. 5, 2017, the subject matter of which is incorporated herein by reference.

BACKGROUND OF THE INVENTION

1. Field of the Invention

The present invention relates to a geomorphological structure monitoring system, particularly, to a geomorphological structure monitoring system for monitoring a scour depth of riverbed or seabed.

2. Description of Related Art

When heavy rain or typhoon strikes, sudden floods will scour the riverbed and causing problems such as earth flow or hillside sliding under the geographical environments such as unstable climate, fast-flowing rivers, or undulating terrain coupled with human factors such as overexploitation of land. In particular, it poses a serious threat to the structural stability and safety of bridge piers.

The traditional method for measuring the scour depth of riverbed and the water level of the river is operated manually, thus the accuracy of the measurement relies on the operation experience of the inspectors. However, concerning the safety issue of the inspectors under climates such as heavy rain or typhoon, the scouring condition of the riverbed may not be monitored immediately. Therefore, warnings may not be issued efficiently and loss of life and property of passers-by may happen. Accordingly, many devices for monitoring the scour depth and the water level have been developed for monitoring the scouring condition of the riverbed. For example, the riverbed monitoring systems can be divided into a contact type and a non-contact type, wherein the contact type of the monitoring system may use a noose to extend the counterweight element along the fixed sleeve to the scouring surface and calculate the length of the noose to determine the scouring condition. However, this type of measuring method requires on-site measurement, and the accuracy of the measuring result is easily affected by factors such as siltation so that the real scouring condition of the riverbed cannot be monitored precisely and instantly. Furthermore, an example of the non-contact type of monitoring system may be a plurality of thermometer vertically arranged in intervals along the riverbed section. The scouring condition may be determined by the temperature changes of each thermometer. However, the thermometers disposed under the riverbed are easily damaged; thus, it is difficult to monitor the structure of the riverbed correctly.

Accordingly, a geomorphological structure monitoring system having a simple structure, low cost, and long lifetime is needed to instantly monitor the scour depth of the riverbed or seabed, the safety of the bridge or other constructions, and the earth flow.

SUMMARY OF THE INVENTION

In order to achieve the aforementioned object, the present invention is to provide a geomorphological structure monitoring system, which includes a supporting base having an accommodating space and a plurality of through holes, wherein at least a portion of the supporting base is embedded under a ground; a plurality of sensing devices arranged in the accommodating space vertically and embedded under the ground, wherein the sensing devices may generate a sensing signal when the sensing devices are exposed from the ground due to structural change of the ground; a signal processing device receiving and processing the sensing signal; and a transmission device stringing the sensing devices in intervals and connecting the sensing devices and the signal processing device.

In a preferred embodiment, the supporting base further comprises a plurality of stiffening separators to separate the accommodating space for forming a plurality of sub-accommodating spaces, wherein the sensing devices are separately disposed in the sub-accommodating spaces.

In a preferred embodiment, the sensing devices are selected from the group consisting of an acceleration sensor, a pressure sensor, a vibration sensor, a temperature sensor, an acoustic sensor, a gyro sensor, and an image sensor. The sensing devices are preferably acceleration sensors and vibration sensors; however, the present invention is not limited thereto. For example, any sensing devices that can generate a different sensing signal when the sensing devices are exposed in the river due to subsidence of the riverbed may be used. For instance, when the sensing devices are vibration sensors, the sensing devices embedded in the riverbed should be motionless, thus the signal detected by the sensing devices should be constant, and when the water scours the river bed and exposing the sensing devices to the river flow, the vibration sensors may generate mutative signals due to the replacement or vibration caused by the river flow. Accordingly, the mutative signals may be used to determine whether a depth, where the sensing device was disposed, was scoured by the river.

In a preferred embodiment, each of the sensing devices includes a main body having at least one elongated slot; at least one magnetic element disposed in the at least one elongated slot, and an induction coil winding the main body repeatedly and the induction coil is vertical to an extending direction of the at least one elongated slot, when the sensing devices are exposed from the ground due to structural change of the ground, the at least one magnetic element moves within the at least one elongated slot due to a fluid flow and causes the induction coil to generate a sensing current as the sensing signal.

In a preferred embodiment, the at least one magnetic element is a ball made of ferromagnetic material.

In a preferred embodiment, the structural change of the ground is determined by the signal processing device through the sensing signal.

That is, the sensing devices are vertically embedded in the ground in intervals, and each of the sensing devices is embedded in their own fixed depth. When the ground is scoured by the river or sea water, a portion of the sensing devices exposed from the ground may be detected based on the varying sensing signals generated by those exposed sensing devices; therefore, the scour depth may be calculated by the signal processing device. In addition, a predetermined reference value is set by the signal processing device, so that a warning signal will be sent when a value of the scour depth is higher than the predetermined reference value. Furthermore, the acceleration sensors, the pressure sensors, the vibration sensors, the temperature sensors, the acoustic sensors, the gyro sensors, or the image sensors are also embedded under the ground initially, and when the sensors are exposed from the ground, which is scoured by the river or sea water, the distinguishable signals of acceleration, pressure, image, sound, or temperature changes may be detected and calculated to determine the conditions such as scour depth, flow rate, or water level.

In a preferred embodiment, the geomorphological structure monitoring system may further comprise a counterweight unit disposed at the end of the transmission device. The counterweight unit may pull down the sensing devices connected to the transmission device by gravity, so that the vertical alignment of the sensing devices and depths of each of the sensing devices may be maintained under the effect of water flow.

In addition, the present invention provides another geomorphological structure monitoring system, wherein the geomorphological structure monitoring system comprises a supporting base having an accommodating space and a plurality of through holes, wherein at least a portion of the supporting base is embedded under a ground; a plurality of sensing devices disposed in the accommodating space; wherein the sensing devices may generate a sensing signal when structural change of the ground occurs; a signal processing device receiving and processing the sensing signal; a transmission device disposed in the accommodating space, stringing the sensing devices in intervals, and connecting the sensing devices and the signal processing device; and a counterweight unit disposed at the end of the transmission device and contacting the ground, wherein the counterweight unit moves downwardly by gravity as the ground subsides due to structural change of the ground.

In a preferred embodiment, when the counterweight unit moves downwardly by gravity as the ground subsides, the sensing devices move along with the counterweight unit.

In a preferred embodiment, the sensing devices are selected from the group consisting of an acceleration sensor, a pressure sensor, a vibration sensor, a temperature sensor, an acoustic sensor, a gyro sensor, and an image sensor; wherein each of the sensing devices generates a sensing signal due to a fluid flow when structural change of the ground occurs. The sensing devices are preferably acceleration sensors and vibration sensors. However, the present invention is not limited thereto; any sensing devices that can generate a different sensing signal when the sensing devices are exposed in the river due to subsidence of the riverbed may be used.

In a preferred embodiment, each of the sensing devices includes at least one elongated slot; at least one magnetic unit disposed in the at least one elongated slot; and an induction coil winding the main body repeatedly. The induction coil is vertical to an extending direction of the at least one elongated slot, wherein the at least one magnetic unit move within the at least one elongated slot due to a fluid flow and causes the induction coil to generate a sensing current as the sensing signal when a structural change of the ground occurs.

In a preferred embodiment, the at least one magnetic element is a ball made of ferromagnetic material.

In a preferred embodiment, structural change of the ground is determined by the signal processing device through the sensing signal.

The geomorphological structure monitoring system provided by the present invention may be used to monitor the scour depth of the river bed or the seabed and the water level/flow rate for flood control security; also, the system provides warnings when the condition is critical to ensure the safety of river or offshore constructions (such as piers, dikes, oil platforms, offshore wind power facilities, etc.).

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape, and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Embodiment 1

Figure 1:
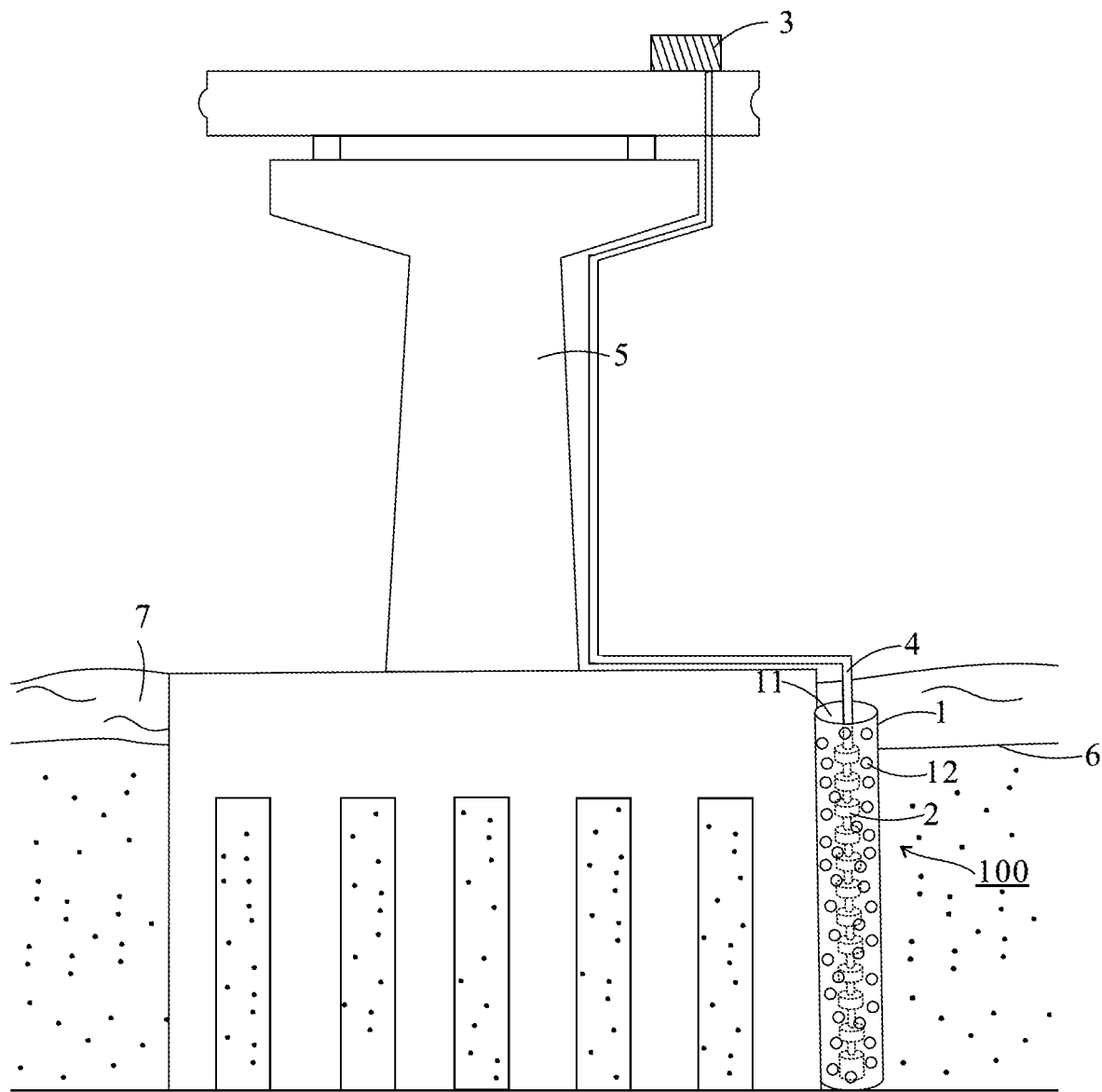
FIG. 1 is a schematic view of the geomorphological structure monitoring system of Embodiment 1 of the present invention.

The geomorphological structure monitoring system is illustrated in FIG. 1. As shown in FIG. 1, the geomorphological structure monitoring system 100 includes a supporting base 1; a plurality of sensing devices 2; a signal processing device 3; and a transmission device 4.

The supporting base 1 is a hollow shell having an accommodating space 11, wherein a plurality of through holes 12 is formed on the wall of the supporting base 1. The through holes 12 allow the soil of the riverbed 6 or river water to flow in and out of the accommodating space 11. The sensing devices 2 are connected to the signal processing device 4 in intervals, and the signal processing device 4 and the sensing devices 2 are accommodated in the accommodating space 11 of the supporting base 1. The transmission device 4 connects the signal processing device 3, and the transmission device 4 may be disposed on a bridge pier 5.

The material of the supporting base 1 is not particularly limited, wherein the supporting base 1 is preferably made of a material that is non-corrosive, such as plastic or stainless steel. The number and the size of the through holes 12 are not particularly limited as long as the through holes 12 may allow the soil of the riverbed 6 and the river 7 to flow in the supporting base 1 when the supporting base is disposed under the riverbed 6 of in the river 7.

Figure 2:
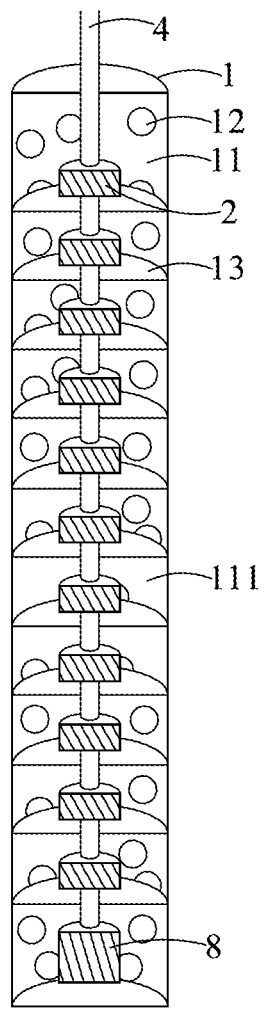
FIG. 2 is a schematic view of a portion of the geomorphological structure monitoring system of Embodiment 1 of the present invention.

Please refer to FIG. 2, which illustrates a section view of a supporting base 1 of another embodiment, wherein the supporting base 1 further includes a plurality of stiffening separators 13 to separate the accommodating space 11 for forming a plurality of sub-accommodating space 111, and each of the sub-accommodating space 111 accommodates a sensing device 2. The stiffen separators 13 may prevent the river water to pour into the accommodating space 11 from the upper end of the supporting base 1 and scour the soil in the accommodating space 11 causing a portion of the sensing devices 2 exposing to the river and generates a wrong sensing signal.

Figure 3:
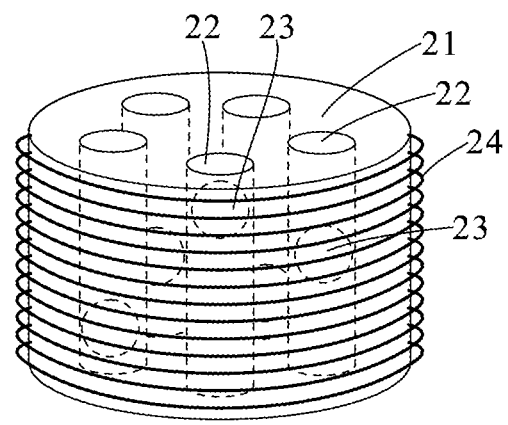
FIG. 3 is a perspective view of the sensing device of Embodiment 1 of the present invention.

In the present embodiment, the sensing device 2 is illustrated in FIG. 3, wherein the sensing device 2 includes a main body 21; a plurality of elongated slots 22; a plurality of magnetic elements 23; and an induction coil 24. The main body 21 is made of plastic material. The elongated slots 22 are closed spaces formed in the main body 21. The magnetic elements 23 are respectively disposed in an elongated slot 22 and are movable in the closed space of those elongated slots 22. The induction coil 24 winds the main body 21 repeatedly and vertically to an extending direction of the elongated slots 22. When a sensing device 2 vibrates due to the water flow, the magnetic elements 23 will move along the elongated slots 22, and when the magnetic elements 23 move across the induction coil 24, an induction current will be generated by the induction coil 24 so that the sensing device may generate a sensing signal.

Figure 4:
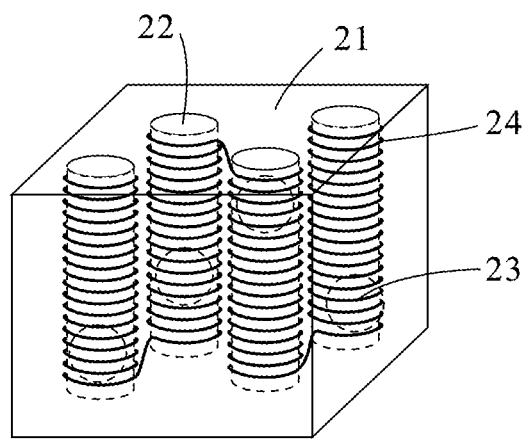
FIG. 4 is a perspective view of another sensing device of Embodiment 1 of the present invention.

In another embodiment, the sensing device 2 is illustrated in FIG. 4, which is similar to that illustrated in FIG. 3. The sensing device 2 comprises a main body 21, a plurality of elongated slots 22, a plurality of magnetic elements 23, and a plurality of induction coils 24, wherein the induction coils 24 wind each of the elongated slots 22 individually, and the induction coils 24 winding the elongated slots 22 are connected in series or in parallel with each other. Similarly, when the sensing devices 2 vibrate due to the water flow, the magnetic elements 23 will move within the elongated slots 22, and when the magnetic elements 23 move across the induction coils 24, induction currents will be generated by the induction coils 24 and the induction currents will be transmitted in series or in parallel so that the sensing device 2 may generate sensing signal.

Furthermore, since each of the sensing devices 2 is disposed in a fixed depth under the riverbed 6 initially, the magnetic elements 23 of the sensing devices 2 are in a stationary state and will not generate the induction currents. When the riverbed 6 is scoured by river 7, a portion of the sensing devices 2 may be exposed to the river 7 and vibrating due to the river flow. Therefore, the signals generated by the sensing devices may determine whether a portion of the sensing devices 2 is exposed to the river 7; the scour depth of the riverbed 6 may then be calculated by the signal processing device 3.

In addition, each of the sensing devices 2 may further include a shell (not shown in figures), which covers the main body 21 and the induction coil 24 and protects them from corrosion due to long-term exposure to water. Also, the number of the sensing devices 2 is not particularly limited; the distance between adjacent sensing devices 2 is also not particularly limited but may be determined according to the depth of the riverbed 6 or the structure of the bridge pier 5.

The transmission device 4 strings the sensing devices 2 so that the sensing devices 2 are vertically hanged in the accommodating space 11 of the supporting base 1.

In addition, the signal processing device 3 receives the sensing signal generated by the sensing devices 2 through the transmission device 4 and output the scour depth of the riverbed 6 after processing the received sensing signals. Furthermore, the signal processing device 3 may transmit the scour depth to a receiving through the wireless or wired transmission. That is, the signal processing device 3 may further include a communication module reading the scour depth or the water level in a predetermined time interval and transmit those values to the receiving terminal for monitoring the scour depth of the riverbed 6. Once the value of the scour depth is higher than the predetermined reference value, a warning signal will be sent immediately to warn the management staffs.

The geomorphological structure monitoring system 100 may further comprise a counterweight unit 8, wherein the counterweight unit 8 is disposed at the end of the transmission device 4 and is placed on the riverbed 6. When the structure of the riverbed changes, the counterweight unit 8 moves up and down along the subsided riverbed 6. In a preferred embodiment, the sensing devices 2 will sink with the counterweight unit 8 as the counterweight unit 8 moves downwardly due to the subsided riverbed 6.

Embodiment 2

Figure 5:
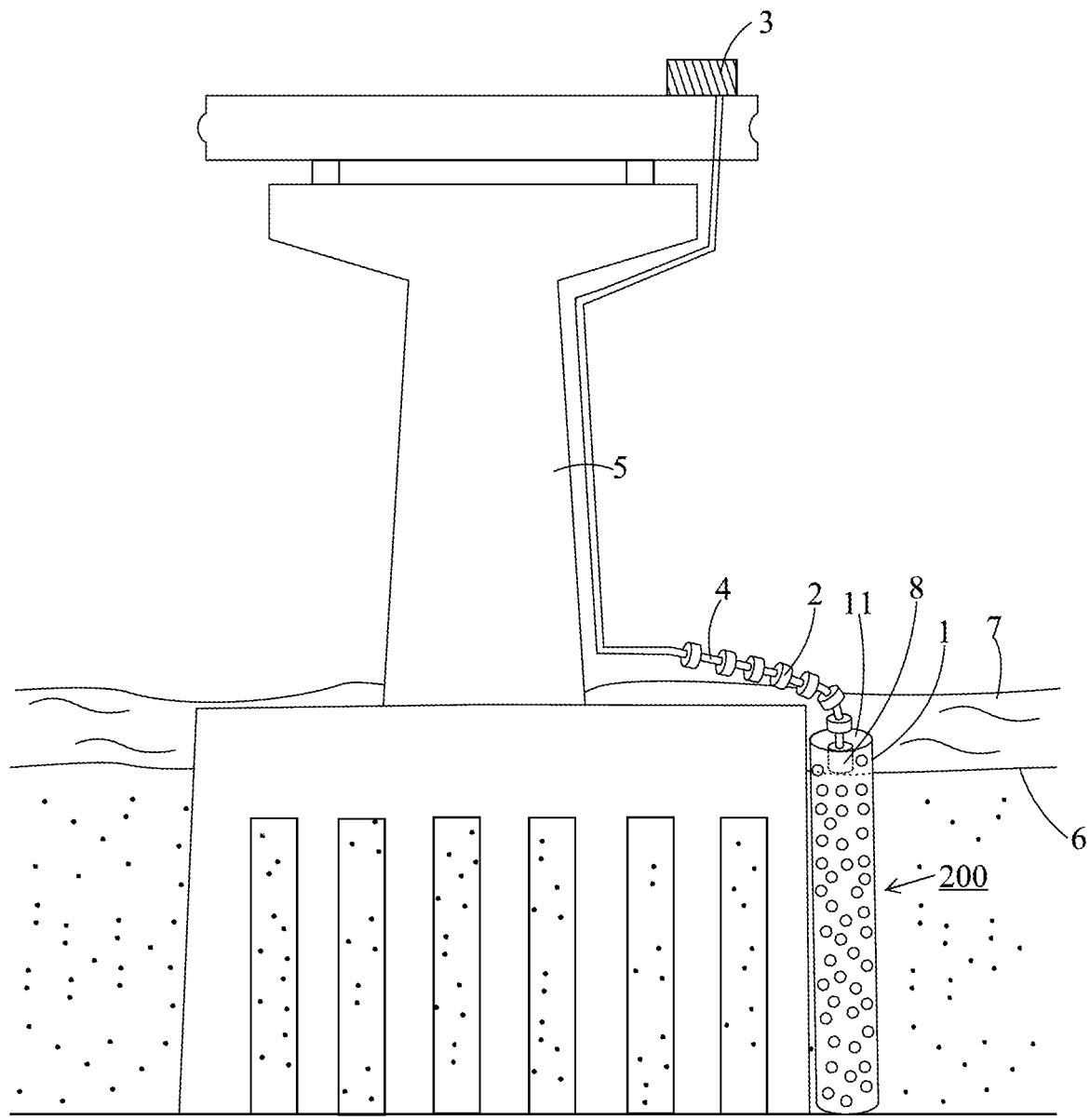
FIG. 5 is a schematic view of the geomorphological structure monitoring system of Embodiment 2 of the present invention.

A geomorphological structure monitoring device 200 provided by another embodiment of the present invention is illustrated in FIG. 5, wherein the geomorphological structure monitoring device 200 comprises a supporting base 1, a plurality of sensing devices 2, a signal processing device 3, a transmission device 4, and a counterweight unit 8.

The structural features of the supporting base 1, the sensing devices 2, the signal processing device 3, and the transmission device 4 are similar to that in Embodiment 1, for purposes of brevity, any description in Embodiment 1 above is incorporated herein insofar as the same is applicable, and the same description need not be repeated.

In the present embodiment, the counterweight unit 8 is disposed at an end of the transmission device 4, accommodated in the accommodating space 11 of the supporting base 1, and contacting the riverbed 6. The sensing devices 2 may be towed away by the counterweight unit 8 under the action of gravity.

Figure 6:
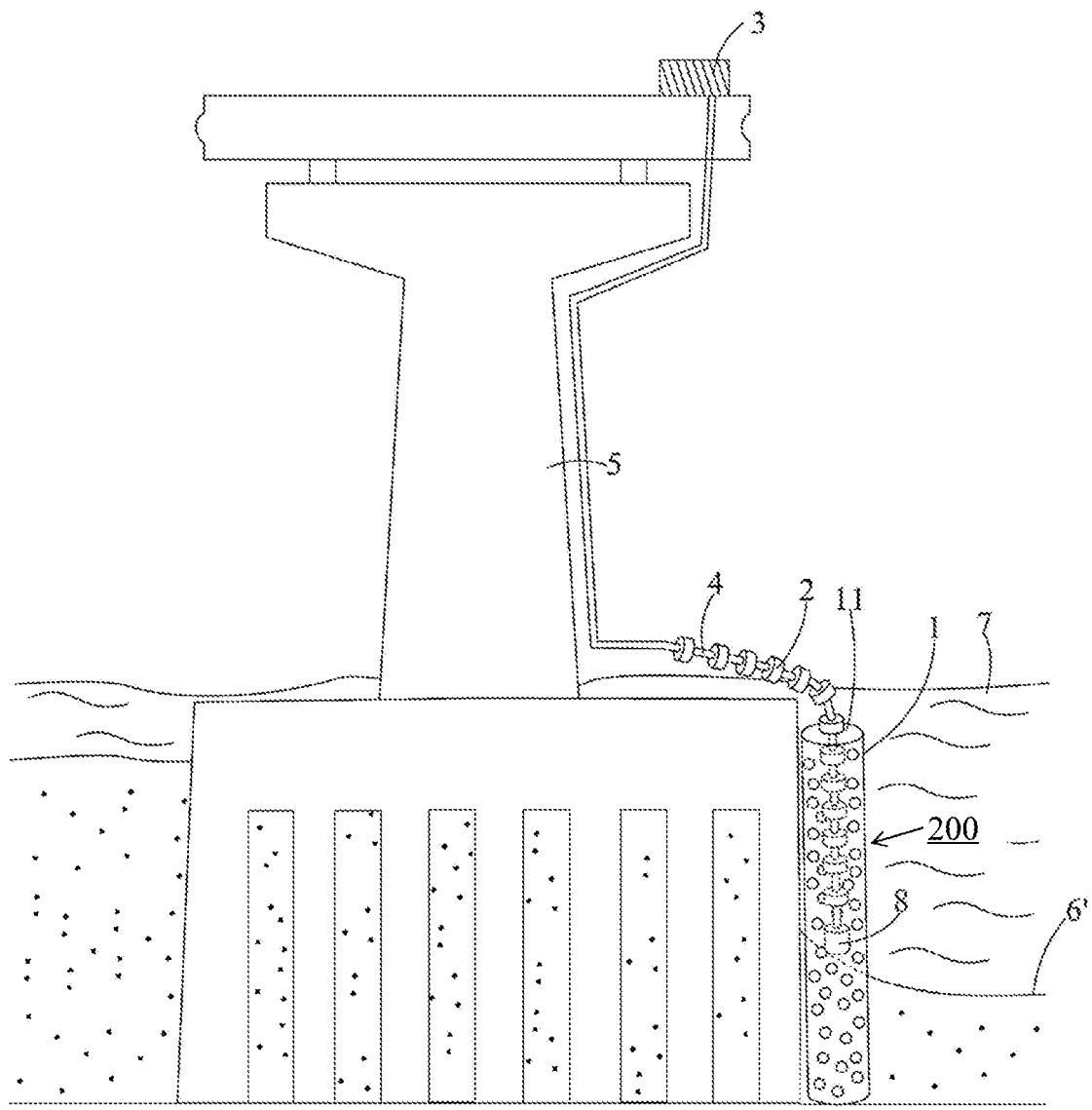
FIG. 6 is a schematic view of the geomorphological structure monitoring system of Embodiment 2 of the present invention.

The difference between the present embodiment and Embodiment 1 is that the sensing devices 2 connected to the transmission device 4 are not completely accommodated in the accommodating space 11 and not embedded under the riverbed 6 at the initial state. Since the counterweight unit 8 disposed at the end of the transmission device 4 is placed on the riverbed, the signal processing device 4 and most of the sensing devices 2 are disposed upon the river. As illustrated in FIG. 6, when the riverbed 6 scoured by the river subsides, the counterweight unit 8 moves downwardly by gravity and then stop at the new riverbed 6' after scouring. Simultaneously, some of the sensing devices 2 are towed into the river by the counterweight unit 8 and start to vibrate due to the river flow; therefore, those sensing devices 2 in the river will generate the sensing signals. The scour depth of the riverbed can be calculated by the signal processing device 3 based on the number of the sensing devices 2 sinking in the river. Furthermore, the signal processing device 3 may transmit the scour depth to a receiving through the wireless or wired transmission. That is, the signal processing device 3 may further include a communication module reading the scour depth or the water level in a predetermined time interval and transmit those values to the receiving terminal for monitoring the scour depth of the riverbed 6. Once the value of the scour depth is higher than the predetermined reference value, a warning signal will be sent immediately to warn the management staffs.

Although the present invention has been explained in relation to its preferred embodiment, it is to be understood that many other possible modifications and variations can be made without departing from the spirit and scope of the invention as hereinafter claimed.

What is claimed is:

1. A geomorphological structure monitoring system, comprising:
 a supporting base having an accommodating space, a plurality of through holes, and a plurality of stiffening separators wherein at least a portion of the supporting base is embedded under a ground;
 a plurality of sensing devices arranged in the accommodating space vertically and embedded under the ground, wherein the sensing devices generate a sensing signal when the sensing devices are exposed from the ground due to a structural change of the ground;
 a signal processing device receiving and processing the sensing signal; and
 a transmission device stringing the sensing devices in intervals and connecting the sensing devices and the signal processing device,
 wherein the stiffening separators separate the accommodating space for forming a plurality of sub-accommodating spaces, and
 wherein the plurality of sensing device is disposed in the plurality of sub-accommodating spaces separately.

2. The geomorphological structure monitoring system as claimed in claim 1, wherein the sensing devices are selected from the group consisting of an acceleration sensor, a pressure sensor, a vibration sensor, a temperature sensor, an acoustic sensor, a gyro sensor, and an image sensor.

3. The geomorphological structure monitoring system as claimed in claim 2, wherein each of the sensing devices includes a main body having at least one elongated slot; at least one magnetic element disposed in the at least one elongated slot; and an induction coil winding the main body repeatedly and the induction coil is vertical to an extending direction of the at least one elongated slot, when the sensing devices are exposed from the ground due to structural change of the ground, the at least one magnetic element moves within the at least one elongated slot due to a fluid flow and causes the induction coil to generate a sensing current as the sensing signal.

4. The geomorphological structure monitoring system as claimed in claim 3, wherein the at least one magnetic element is a ball made of ferromagnetic material.

5. The geomorphological structure monitoring system as claimed in claim 1, wherein the structural change of the ground is determined by the signal processing device through the sensing signal.

6. The geomorphological structure monitoring system as claimed in claim 1, further comprises a counterweight unit disposed at an end of the transmission device.

* * * * *